United States Patent [19]
Phillips

[11] Patent Number: 6,029,780
[45] Date of Patent: Feb. 29, 2000

[54] BRAKES FOR BICYCLES AND OTHER CHAIN DRIVEN MECHANISMS

[75] Inventor: Jonathan Phillips, Christchurch, New Zealand

[73] Assignee: Sarun Holdings Limited, Christchurch, New Zealand

[21] Appl. No.: 08/913,411

[22] PCT Filed: Mar. 15, 1996

[86] PCT No.: PCT/NZ96/00020

§ 371 Date: Nov. 13, 1997

§ 102(e) Date: Nov. 13, 1997

[87] PCT Pub. No.: WO96/29236

PCT Pub. Date: Sep. 26, 1996

[30] Foreign Application Priority Data

Mar. 17, 1995 [NZ] New Zealand ............................ 270742

[51] Int. Cl.[7] ...................................................... B62L 3/00
[52] U.S. Cl. ........................................................ 188/24.21
[58] Field of Search ............................... 188/24.17, 82.5, 188/82.6, 24.11, 24.12, 24.16, 2 D, 109, 24.21, 24.22, 82.7; 192/217.1, 415, 81 R

[56] References Cited

U.S. PATENT DOCUMENTS

| | | | |
|---|---|---|---|
| 3,486,586 | 12/1969 | Grier, Jr. ............................... | 188/24.19 |
| 3,888,334 | 6/1975 | Mack ................................... | 188/24.17 |
| 4,030,774 | 6/1977 | Foster . | |
| 4,057,127 | 11/1977 | Woodring ............................. | 188/24.16 |
| 4,109,769 | 8/1978 | Darden . | |
| 4,199,046 | 4/1980 | Boyd . | |
| 4,582,178 | 4/1986 | Huneault ................................. | 188/109 |
| 5,337,861 | 8/1994 | Romano . | |

FOREIGN PATENT DOCUMENTS

| | | |
|---|---|---|
| 2270139 | 1/1975 | France . |
| 3325073 | 7/1983 | Germany . |
| 3611490 | 4/1986 | Germany . |
| 3932870 | 10/1989 | Germany . |
| 2028736 | 8/1979 | United Kingdom . |
| 2127123 | 8/1983 | United Kingdom . |

*Primary Examiner*—Christopher P. Schwartz
*Assistant Examiner*—Melanie Talavera
*Attorney, Agent, or Firm*—Dickinson Wright PLLC

[57] ABSTRACT

The invention provides a crank assembly for a chain driven mechanism such as a bicycle. The crank assembly has at one end of a crank arm, a journal adapted for engagement with an axle. The axle has at its other end a connection. The one end of the crank arm has mounted thereon a housing via a unidirectional variable clutch, the housing having an extension to which, in use, an activation means such as a brake cable or cables is/are attached. The arrangement is such that during normal forward rotation the crank arm moves normally and the housing is stationary relative thereto, while during back or reverse movement of the crank arm the housing moves to activate the brake cable or cable means.

21 Claims, 10 Drawing Sheets

BRAKES FOR BICYCLES AND OTHER CHAIN DRIVEN MECHANISMS

TECHNICAL FIELD

This invention relates to an improved brake mechanism for a bicycle and/or other chain driven device.

BACKGROUND TO THE INVENTION

At present most bicycles have brakes which are operated by hand. The hand brakes include levers on the handle bars of the bicycle. The levers are connected by cables to brake callipers situated in association with front and rear wheels of the bicycle. When using the brakes, a cyclist often has to apply a large amount of hand pressure to achieve effective braking and he or she relies solely on adjusting hand pressure to control the front and rear brake callipers. This makes the application of bicycle brakes difficult in some cases, particularly over long down hill runs and over rough terrain where loss of control can occur. Continuous pressure results in soreness to the finger and hand joints and muscles which is further aggravated by airflow over the hands. This creates difficulty in sensing the relative hand pressures required to achieve smooth progressive braking.

A further problem with known braking mechanisms is that, for more complex braking arrangements, variations in the construction at the manufacturing stage are usually required. The use of custom manufactured brake components and associated constructional requirements, limits the situations in which this type of brake mechanism can be used to new bicycles or bicycles requiring major structural modifications.

An object of the present invention is to provide a mechanism for progressive braking wherein the primary pressure which activates the brakes of either or both front and rear wheels is achieved by a cyclists legs, thereby reducing the need for hand strength and allowing the hands greater freedom of movement for steering control.

A further object of the present invention is to provide a brake mechanism which does not require major structural and/or mechanical modifications, and which can be fitted to an existing bicycle with relatively minor modifications.

Yet a further object of the present invention is to provide a modified brake mechanism for chain driven mechanisms such as a bicycle, in which said mechanism can selectively provide progressive braking where, in a cycle, the primary pressure which activates the brakes of the front and/or rear wheels is produced by a cyclists legs. This reduces the need for hand strength and allows the hands greater freedom of movement for steering control.

A further object of this invention is to provide a consumer with a useful alternative choice.

DISCLOSURE OF THE INVENTION

According to a first aspect of the invention there is provided a crank assembly for a chain driven mechanism such as a bicycle, the crank assembly having at one end of a crank arm a journal adapted for engagement with an axle, the axle having at its other end a connection, the one end of the crank arm has mounted thereon a housing via a sprag clutch, the housing having an extension to which, in use, a brake activation means is or are attached, the arrangement being such that during normal forward rotation the axle and crank arm move normally and the housing is stationary while during back or reverse movement of the crank arm the housing moves to activate the activation means.

In an alternative embodiment, the reverse movement of the crank arm may be selected so as to actuate the activation means.

The axle is preferably a standard bottom bracket axle of a bicycle.

The connection may have attached thereto a pedal shaft of a cycle pedal.

The activation means may be a cable or cables connected to a bicycles' front and rear hand brakes.

The crank assembly may be frictionally engaged in known manner to the bottom bracket axle of the bicycle.

The sprag clutch may be formed in the housing by providing an annular sleeve secured to and located between the one end of the crank arm and the housing, the sleeve being spaced from the housing by a series of roller bearings, an inner face of the housing in contact with the roller bearings having arc-shaped cam surfaces on which the roller bearings can move to frictionally engage with the outer surface of the sleeve during reverse back pedalling movement to thereby create the sprag clutch action.

In an alternative embodiment, the housing is adapted so that the inner face of said housing, in contact with the roller bearings, is movable relative to the housing.

Preferably in the alternative embodiment said adaption comprises: forming the housing from a modified housing and a sprag outer releasably secured therein, said sprag outer incorporating said arc-shaped cam surfaces.

Preferably in the alternative embodiment said sprag outer incorporates one or more recesses adapted so that a locking means can removably engage one of said recesses thereby securing said sprag outer in fixed relation to the housing.

Preferably the locking means comprises a rotatable member adapted so as to engage at least one of said recesses over a first range of the rotatable member's rotation and be disengaged from said recesses over a second range of the rotatable member's rotation.

Preferably the rotatable member comprises a cylinder having a longitudinal portion removed therefrom, said portion having a geometry so that the cylinder engages the sprag outer when the cylinder is rotated over a first portion of its rotation.

In an alternative embodiment said rotatable member may comprise a right cylinder, frustum of a cone or similar shape suitably modified so as to be capable of rotational engagement with said recesses.

Preferably the locking means is operated by means of an arm or lever actuated by a cable connected to a switch or similar actuation means.

Preferably the locking means is biased so as to lock the sprag outer in fixed relation to the housing.

In yet another alternative embodiment, the locking member is biased so as to allow free movement of the sprag outer with respect to the housing.

Preferably the locking member, when biased so as to lock the sprag outer, is released or engaged by hand actuation of the brakes.

The roller bearings can be protected by fitting a spacer on the one end crank arm and holding it and the roller bearings, sleeve and housing in place with a circlip.

Further aspects of the invention will become apparent from the following description which is given by way of example only.

BRIEF DESCRIPTION OF THE DRAWINGS

Examples of this invention will now be described with reference to the accompanying drawings in which.

The following examples are described with reference to the invention being attached to a chain driven bicycle. It is to be appreciated that the crank assembly can be used in association with other chain driven mechanisms. For example in controlling the movement of a conveyor or operating a hydraulic brake system.

Figure 1:
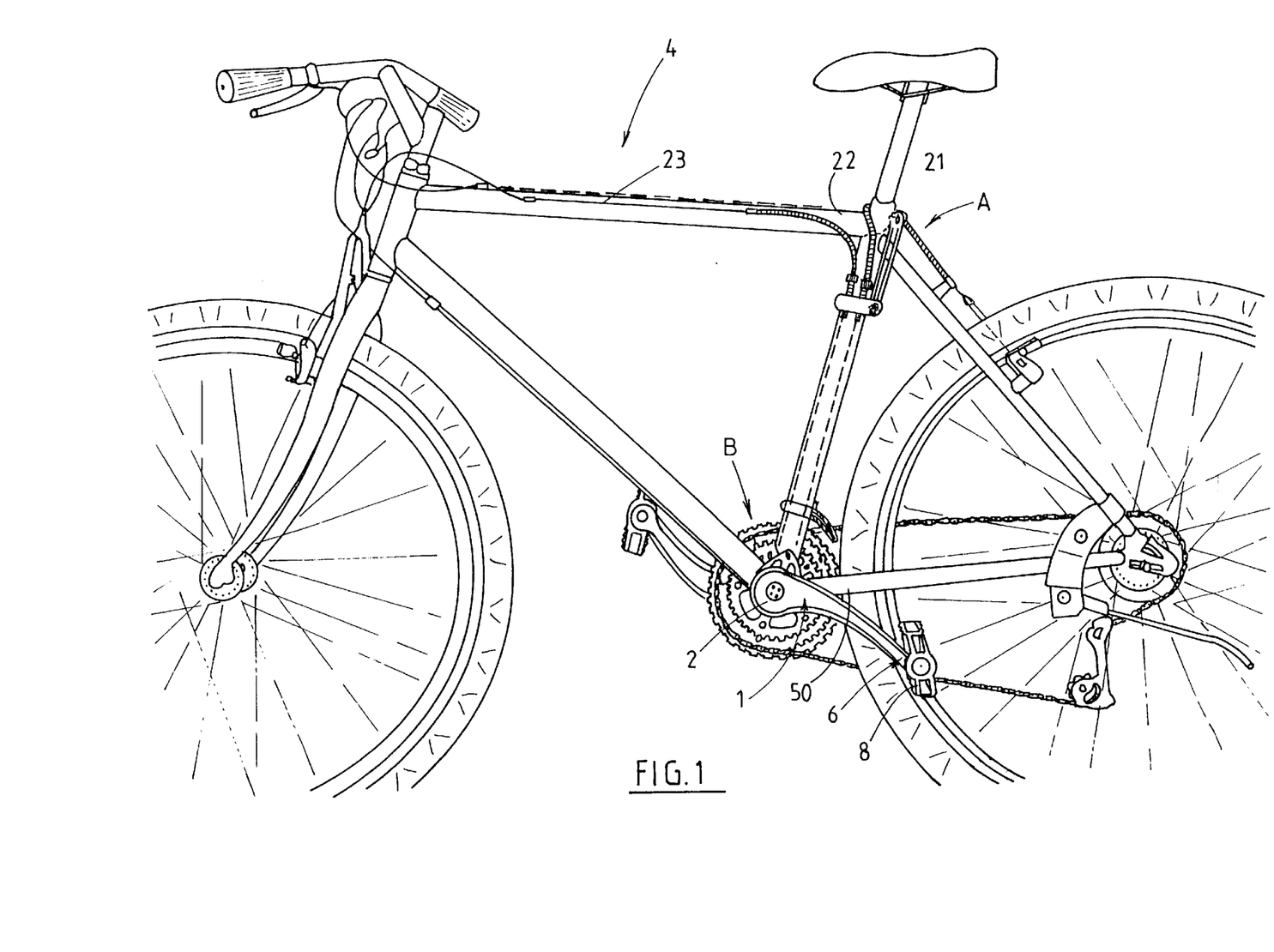
FIG. 1 is a side view of part of an example of a cycle incorporating an improved brake mechanism according to the preferred aspect of the invention.
Figure 2:
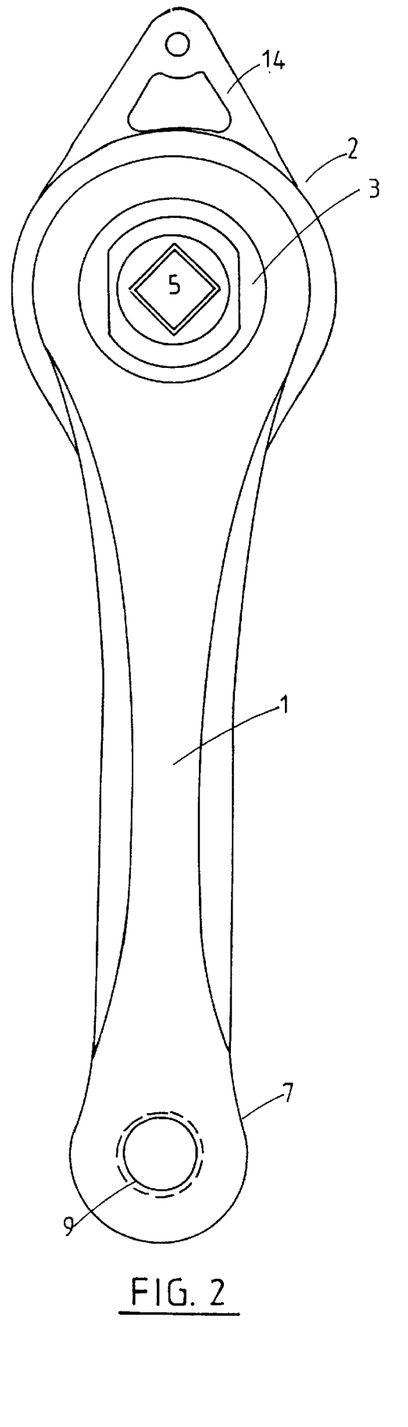
FIG. 2 is a side view of a crank assembly for the brake mechanism of the invention.
Figure 3:
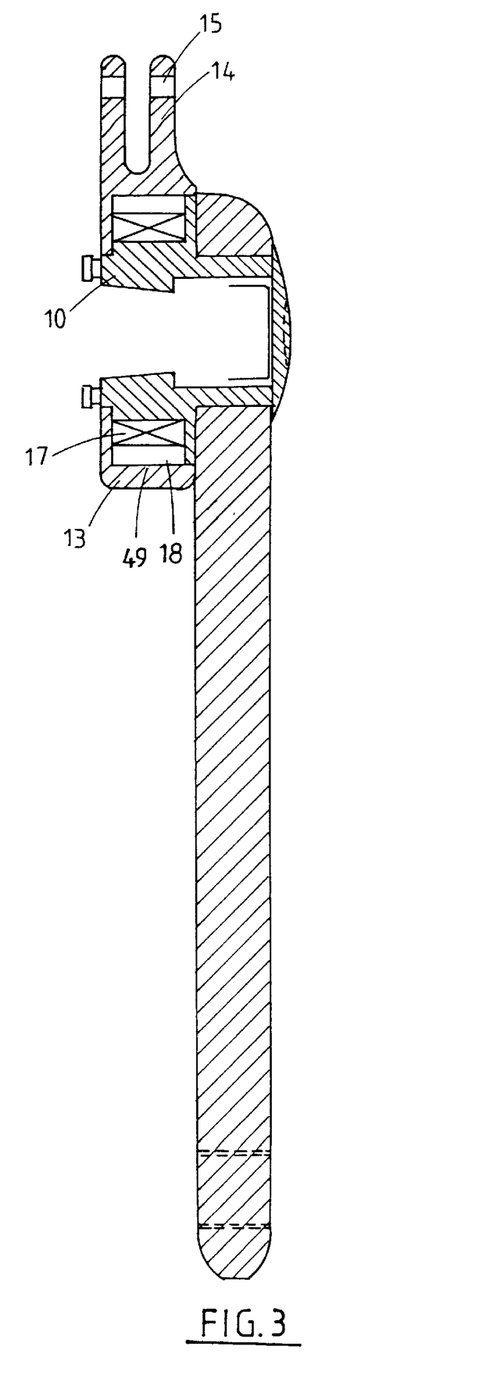
FIG. 3 is a section through the crank assembly shown in FIG. 2.
Figure 4:
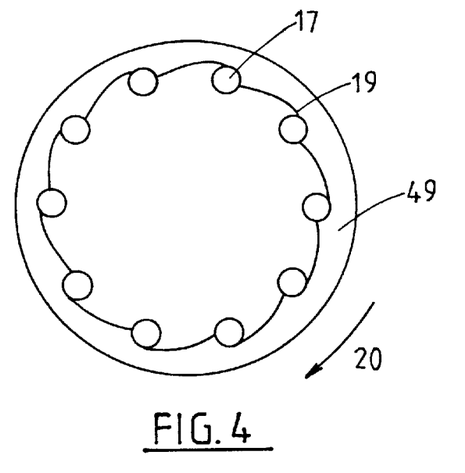
FIG. 4 is a side view of a housing part of the crank assembly showing its arc-shaped cam surfaces with roller bearings positioned therein.
Figure 7:
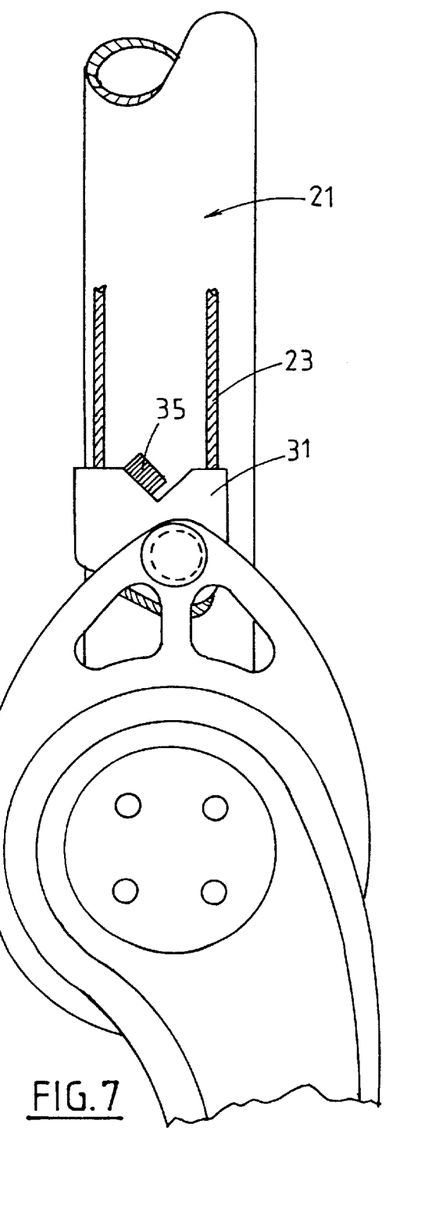
FIG. 7 is a side view showing in detail the connection between a bias cable clamp and the extension.
Figure 8:
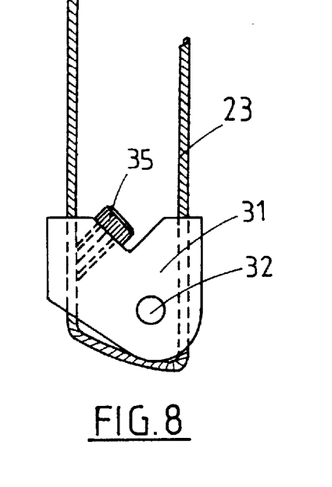
FIG. 8 is a side view of the bias cable clamp shown in FIG. 7.

FIGS. 2 and 3 illustrate a crank assembly for use on the bicycle shown in FIG. 1. Additional details are shown in FIGS. 4, 7 and 8.

The crank assembly consists of a crank arm 1, at one end 2 of which is a standard journal 3 for engagement to a bottom bracket axle (not shown) of a bicycle 4. The axle is normally tapered and has a square section at each end. One of the ends of said axle is engagable in the square section hole 5 in said one end 2 of the crank arm 1.

The other end 6 of the crank arm 1 has a standard connection 7 to which a pedal 8 is mounted. The standard connection may be a threaded bore 9 to which a standard pedal assembly 8 is attached.

Said one end 2 of the crank arm 1 is shaped to have fitted therein a sleeve 10. An outer housing 13 into which is fitted the sprag outer 49 (FIG. 4) and bearing 17, is held in place by a spacer (not shown) which in turn is held in place by a circlip (not shown) mounted in a circlip groove (not shown) on said one end 2 of the crank arm 1.

The sleeve 10 in association with the housing 13 acts as a sprag clutch to control movement of an extension arm 14 formed on the housing 13. The extension arm 14 has a bore 15 to which a bias cable clamp 31 (FIG. 8) is engaged. The housing 13 is mounted on the sleeve 10 by way of a series of roller bearings 17. In the example there are ten roller bearings 17 positioned at equal intervals around the periphery of the sleeve 10. The hardened inner face 18 of the housing 13 where it contacts the bearings 17 has cam surfaces 19 against which the roller bearings 17 contact when the crank arm 1 is back pedalled (direction of arrow 20). In its normal forward position the crank arm 1 freely rotates relative to the housing 13. Appropriate lubrication is provided for the sprag clutch bearings 17.

In use, reverse pedal movement of the axle (not shown) results in the sprag clutch locking relative to the axle (not shown). Further reverse movement rotates the housing 13 which results in tension being applied via the arm 14 and bias cable clamp 31 to the cable 23 and therefore to the brake calipers. If, at the same time the brake levers (in FIG. 1) are also activated, for example, to apply their braking effect to the front or rear calipers, a differential braking effect is applied to produce greater or lesser braking effect to the respective wheels. As greater power can be applied by the leg muscles the effectiveness of the brakes is increased.

Figure 5:
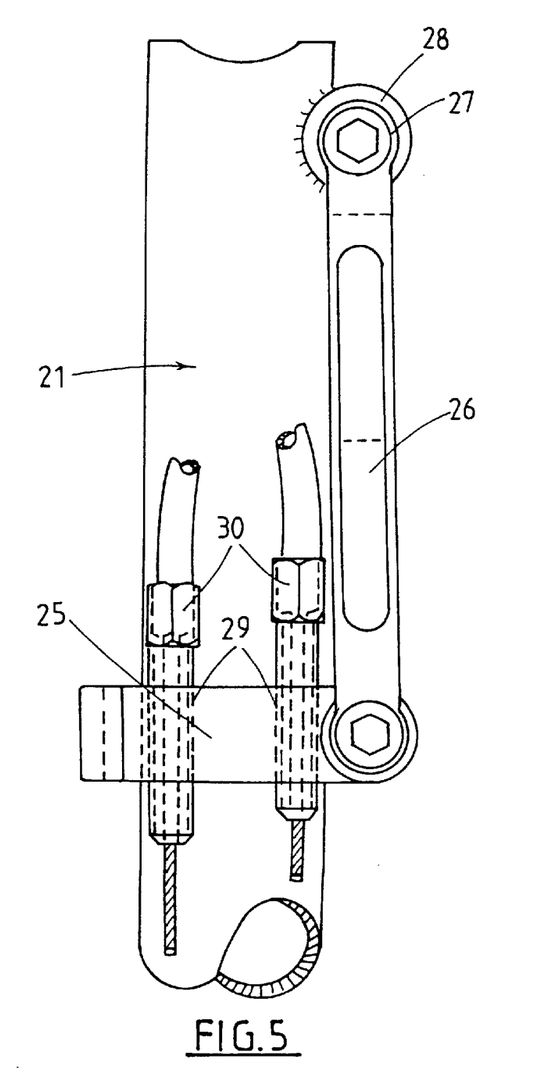
FIG. 5 is a side view of the region A in FIG. 1, showing a brake cable adjuster clamp for use with the brake mechanism.
Figure 6:
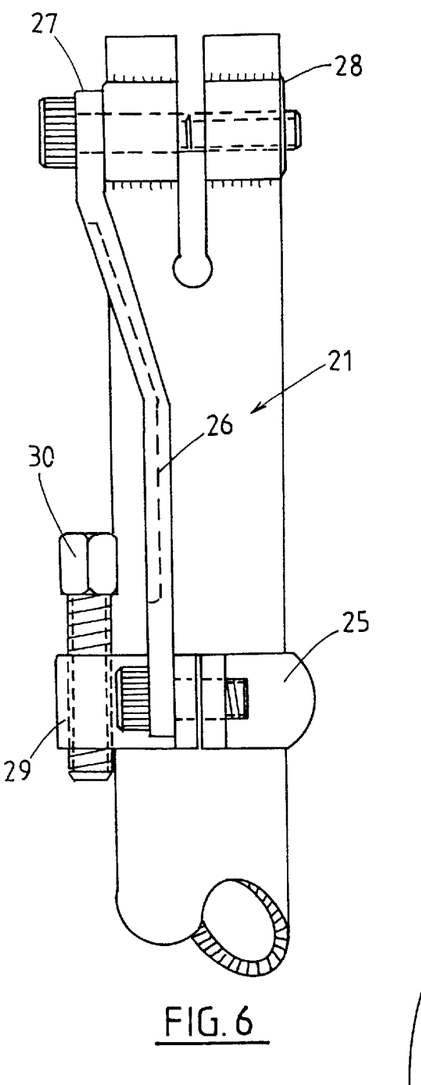
FIG. 6 is a rear view of the region A in FIG. 1, showing the brake cable adjuster clamp shown in FIG. 5.

In FIGS. 5 and 6 is shown a clip-on brake cable adjuster clamp 25. The clamp can be located in position by a fitting 26 which is held at one end 27 to a seat tube bracket 28. The clamp 25 has holes 29 in which adjusters 30 are fitted.

In FIGS. 7 and 8 is shown a bias cable clamp 31 through which a brake cable 23 is inserted. The clamp 31 has a hole 32 through which one end 33 of a safety bar 34 (FIG. 9) extends. The bias cable clamp 31 also has a locking screw 35 used to lock the clamp 31 relative to brake cable 23. The safety bar 34 is shaped as shown and has an arm 36 which operates as described below.

In FIGS. 10 to 17 are shown the parts required for mounting a sprocket (not shown) to bottom bracket axle.

Figure 10:
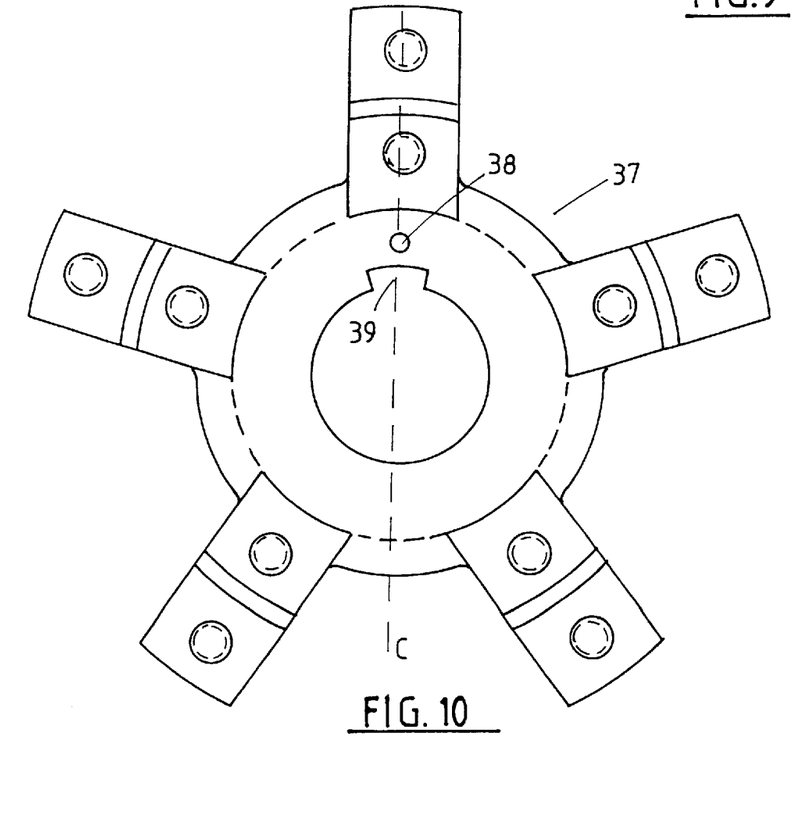
FIG. 10 is a side view of a sprocket hub for use with the crank assembly shown in FIGS. 2 and 3.
Figure 11:
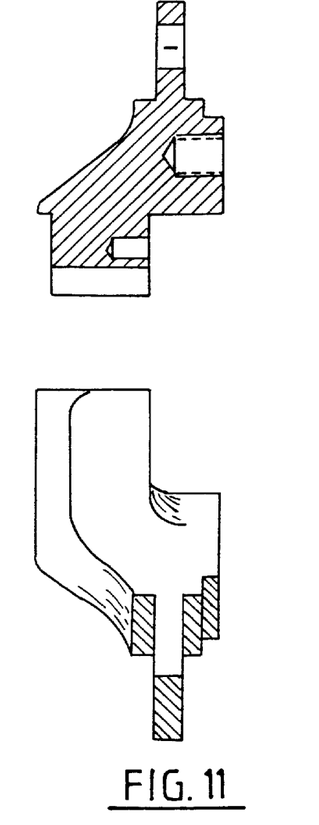
FIG. 11 is a vertical section on the line C—C through the sprocket hub shown in FIG. 10.
Figure 12:
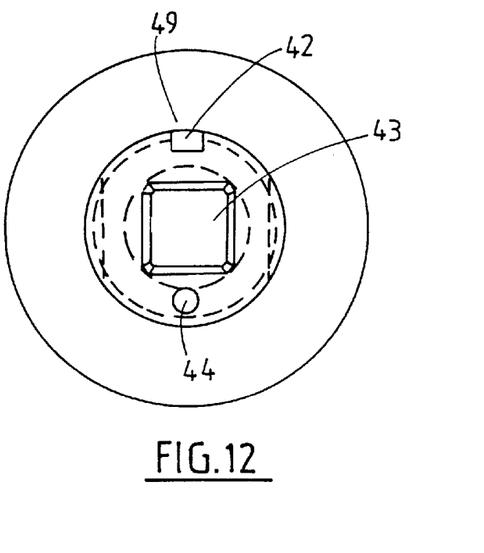
FIG. 12 is a side view of a driving boss adapted for incorporation in the sprocket hub.
Figure 13:
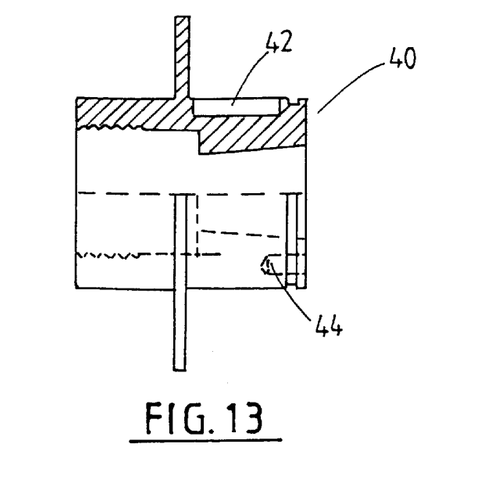
FIG. 13 is a partial section through the driving boss shown in FIG. 12.
Figure 14:
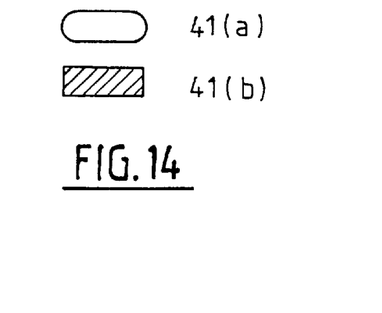
FIGS. 14(a) and 14(b) are a plan and section respectively of a key for locking the sprocket hub and driving boss together.
Figure 15:
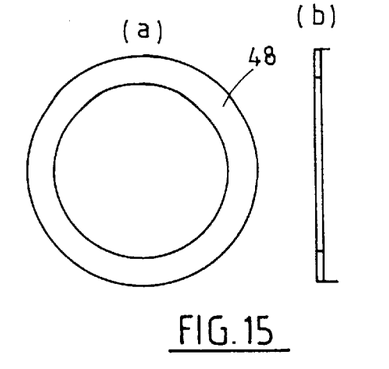
FIGS. 15(a) and 15(b) are a front and side view respectively of a shim washer.
Figure 16:
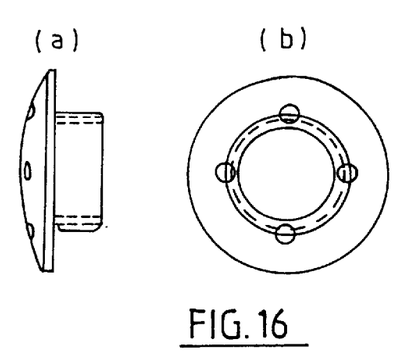
FIGS. 16(a) and 16(b) are a side and front view respectively of a stainless steel cover bolt.
Figure 17:
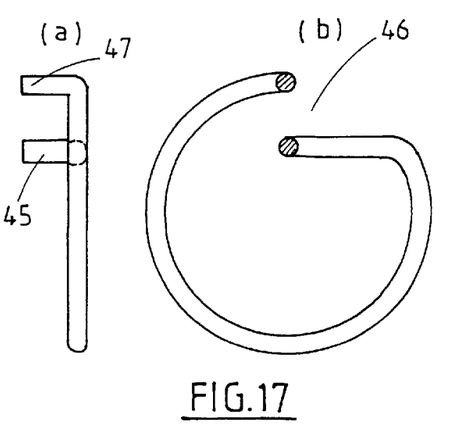
FIGS. 17(a) and 17(b) are a side and front view respectively of a spring for controlling relative movement between the sprocket hub and driving boss.

A sprocket or set of sprockets (not shown) is mounted to a sprocket hub 37 (FIGS. 10 and 11). The hub 37 has a hole 38 and slot 39 to enable a driving boss 40 (FIGS. 12 and 13) to be located therein. The boss 40 when fitted in the hub 37 can move a small distance relative thereto as a key 41 in keyway 42 in the boss 40 moves in slot 39 in the hub 37. The driving boss 40 includes a square section 43 engagable on the bottom bracket axle (not shown). The boss 40 has a hole 44 in which one end 45 of a spring 46 (FIG. 17) is engaged. The other end 47 of the spring 46 is engaged in the hole 38. The shim washer 48 may be fitted between spring 46 and a circlip (not shown) which holds the parts together.

A clip-on mounting may also be provided (FIGS. 5 and 6) where the seat tube 21 meets a crossbar 22. This mounting includes two adjusters through which a single cable for front and back brakes pass. The adjusters are manufactured as part of an easily fitted attachment for a standard bicycle frame. This will allow the applicants to market the present invention as an add-on to existing cycles rather than requiring the brake system to be installed at assembly or as part of the cycles construction. A minimum of modification will therefore be required to an existing cycle to incorporate the present invention.

In this example the bias cable clamp 31 (FIGS. 7 and 8) can be replaced by different fittings of the same general shape. The fitting has its hole 32 in a different position to adjust the degree of bias between the front and rear brakes to suit a users requirements.

The relative movement between the sprocket hub 37 (FIG. 10) and driving boss 40 (FIG. 13) ensures there is no lock-up when a rider restarts forward pedalling as there is a degree of free forward angular movement of the pedal before the key 41 locks against a face 49 of the slot 49. The spring 46 acts as a return spring and absorbs shock at this time.

Figure 9:
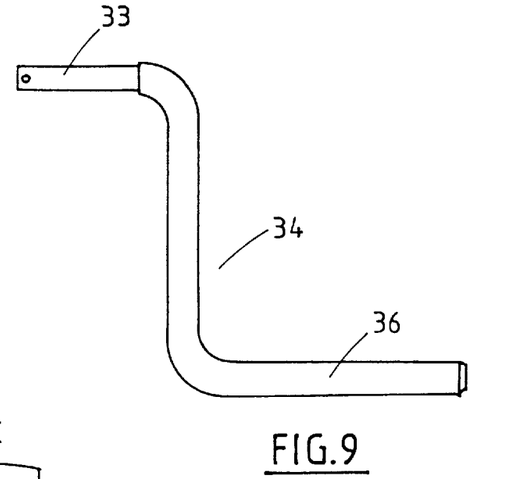
FIG. 9 is a front view of a safety bar for use with the crank assembly on a bicycle.

The safety bar 34 extends so that arm 36 contacts the bottom edge of frame member 50. This ensures that the extension 14 does not lock up if the sprag clutch jams. The bar 34 ensures that the extension 14 never moves too far forward and locks up.

By the invention described above, the rear motion (or "back-pedalling") results in the sprag clutch engaging the sleeve 10 attached to the housing 13 thereby causing the housing 13 to be radially displaced thus transmitting a tension through the brake cable 23 (via the bias clamp 31). It is considered to be advantageous that a consumer be offered the choice between a configuration described as above, and that the user may optionally select between pedal assisted braking and a free wheeling back-pedal action. In situations such as these the sprag outer 49 shown in FIG. 4 is freely rotatable within the housing 13, but may be locked by the cyclist to provide pedal braking.

Figure 18:
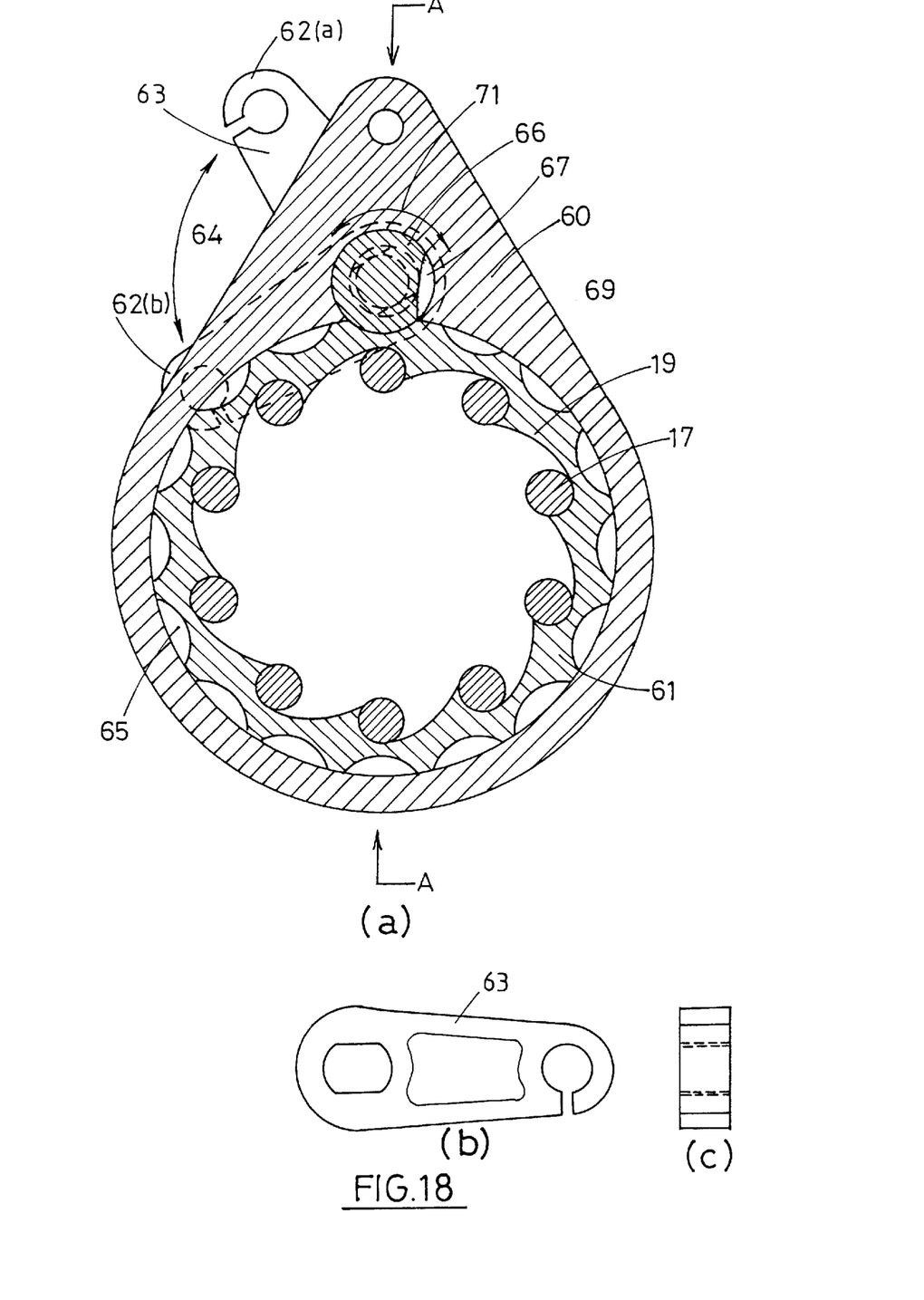
FIGS. 18(a), 18(b) and 18(c) are a side view and details of a modified housing incorporating a movable sprag outer.
Figure 19:
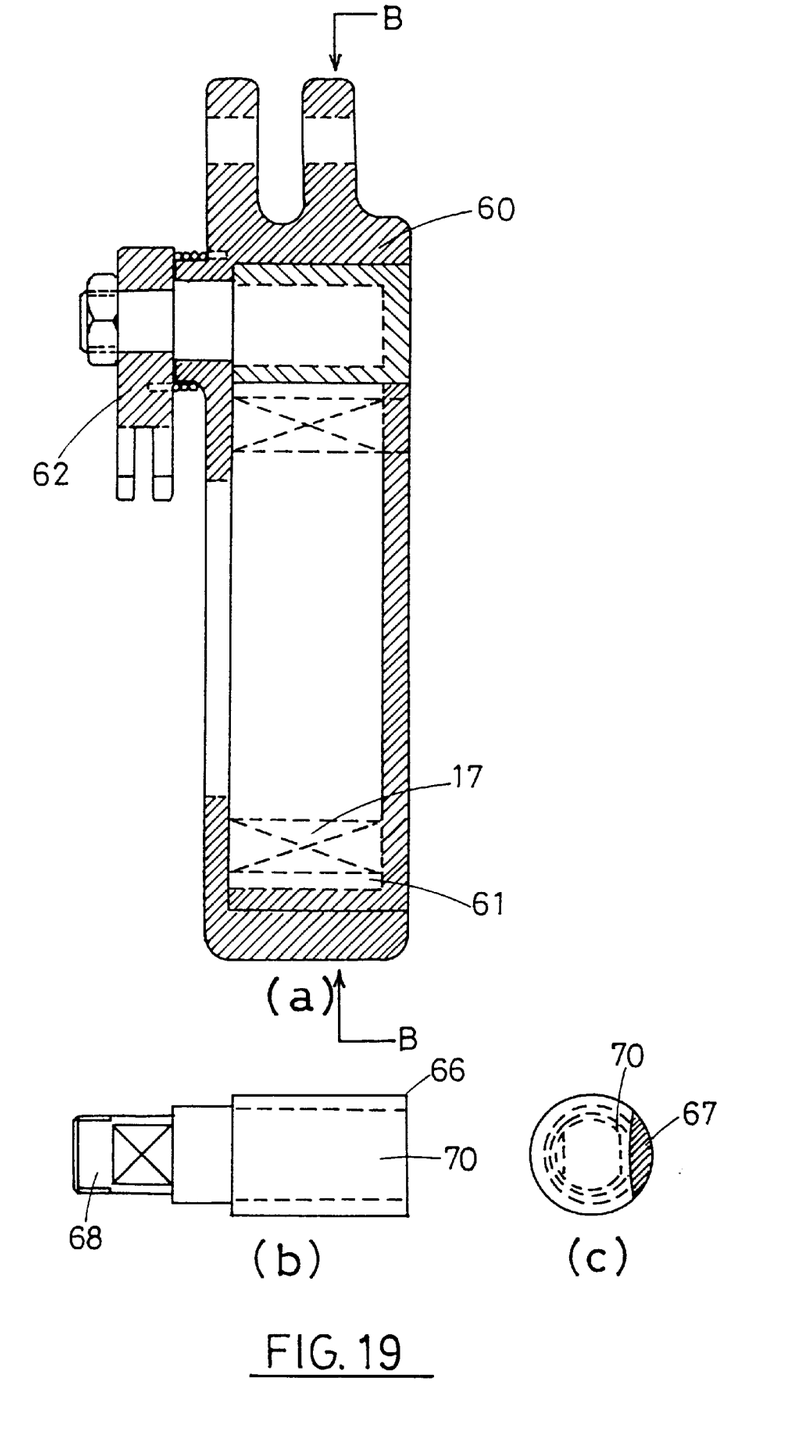
FIGS. 19(a), 19(b) and 19(c) show a section through the housing along the line A—A, and details of the locking means respectively.
Figure 20:
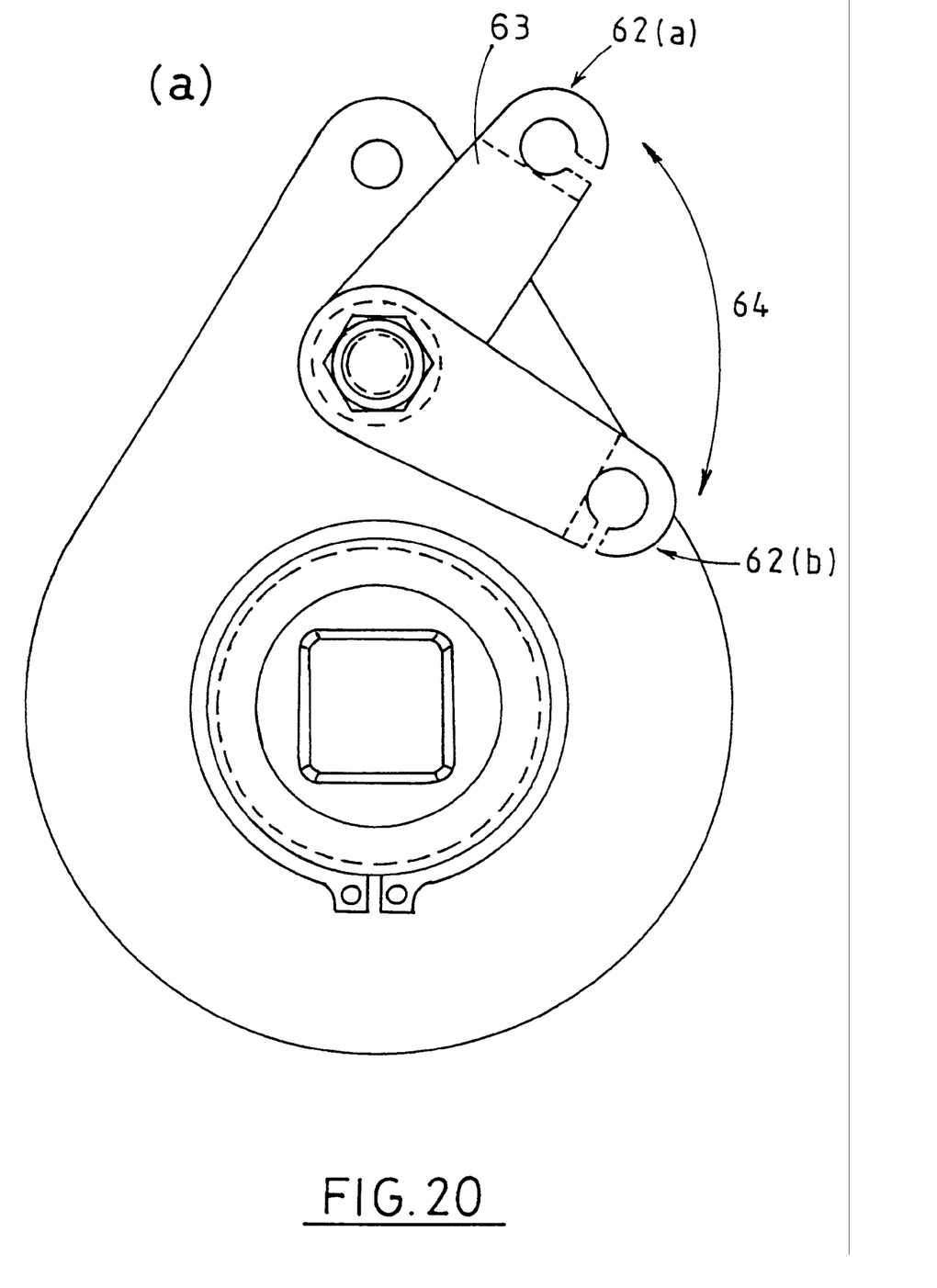
FIG. 20 illustrates a side view of a modified housing.

This alternative configuration is shown in FIGS. 18 to 20 whereby a modified sprag outer 61 is free to rotate within a modified housing 60. Roller bearings 17 are contained within the sprag outer 61 as described above and interact via the cammed surfaces 19 as previously described.

The modified housing incorporates a rotatable locking means 66 (FIGS. 19*b,c* and FIG. 18). The locking means 66 is formed from a cylindrical pin having a longitudinal portion 67 removed therefrom. This modification leaves a longitudinal 'notch' running the length of the locking means (indicated by the unshaded portion 67 in FIG. 18) which has a curved surface 70 adapted to accommodate the outer surface of the sprag outer 61.

Referring to FIG. 18 the locking means is shown in the locked position. It can be seen that if the locking means 66 is rotated as indicated by arrow 71, the longitudinal notch left by removing lengthwise portion of the cylinder will allow the sprag outer to pass the previously protruding cylinder portion and thus rotate freely within the modified housing 60. If the locking means 66 is rotated so that the remaining portion of the cylinder (indicated by the shaded section of the locking member 66) is brought into engagement with one of the recesses 65, the sprag outer will be locked in relation to the modified housing 60.

The locking means 66 is operated by means of a lever arm 63 which pivots about the axis of the cylinder 66. The locked position is indicated by the dotted arm 62*b* and the unlocked position by the solid line 62*a* with the rotation indicated by arrow 64.

In the default configuration (operating as a back-pedal brake described above) the lever arm 63 is biased (by a coil spring or similar means) so that the locking means 66 engages the sprag outer 61. Thus when the roller bearings bias against the arc-shaped cam surfaces 19 as the pedal is rotated backwards, the housing 60 is radially displaced thus tensioning the brake cables 27.

The user may selectively disengage the locking means 66 from the sprag outer recess 65 in order to allow the sprag outer 61 (when engaging the outer surface of the sleeve) to rotate freely. It is to be understood that the modified housing 60 may be suitably modified to accommodate the locking means therethrough or therein. Such modifications are considered to be within the purview of one skilled in the art and will not be discussed further. Other rotatable members are envisaged in addition to the cylindrical one shown in FIGS. 18, 19 and 20. Such shapes might include tapered members or the like.

It is envisaged that while a particular sprag outer configuration is shown in FIG. 18, other variations are possible, including inserting a pin carried by the locking means 66, into a recess in the sprag outer. Such variations are to be considered within the scope of the present invention. However, the construction shown in FIGS. 18, 19 and 20 is particularly suitable in that it provides a robust and simple locking mechanism.

Details of the lever arm 63 are shown in FIG. 18*b* and the cylindrical locking means 66 in FIG. 19*b* and *c*. An external view of the modified housing is shown in FIG. 20.

The locking/unlocking action whereby the sprag outer is either held fixed in relation to the modified housing 60, or allowed to radially rotate therein, may be actuated by means of a cable which is operated either independently of the hand brakes or in conjunction therewith. In an alternative embodiment, the default configuration may allow the sprag outer to rotate freely within the modified housing 60 whereupon when a user activates the hand brakes, the locking means 66 automatically engages with the sprag outer recess 65 so that a backwards pedal action will actuate the brake mechanism as described above. Such variations are considered to be within the scope of the present invention and any modifications as may be necessary are to be construed as within the scope of one skilled in the art.

Thus, there is provided an embodiment of the above-mentioned invention whereby the pedal assisted braking action may be disengagable by the user in a number of combinations. Such a variation is considered to be a desirable feature of the present improved brake assembly.

In an alternative embodiment, the present invention may be used to actuate an hydraulic piston, mounted on member 50, by means of a compression arm attached at one end, to the member 14. In this way it is envisaged that a hydraulically operated braking system may be readily adapted to be controlled by the device of the present invention.

Thus by this invention there is provided an improved bicycle braking means which gives a cyclist biased braking between the front and rear brakes, providing for progressive braking through either or both front and rear callipers.

This invention also provides assistance for a cyclist whereby the front and rear brakes can be easily operated either by hand or foot pressure.

Particular examples of this invention have been described and it is envisaged that improvements and modifications can take place without departing from the scope of the amended claims.

INDUSTRIAL APPLICABILITY

The braking means of the present invention may find application in bicycles. The invention is particularly suitable for applications where large braking forces are required, such on mountain or off road bicycles.

I claim:

1. An assembly for a chain driven mechanism such as a bicycle, comprising:

a crank having at one end of a crank arm a journal adapted for engagement with an axle, said crank arm having at its other end a connection, said one end of said crank arm having mounted thereon a housing via a unidirectional variable clutch, said housing having an extension to which, in use, a brake activator with a device for biasing the braking force between front and rear brakes is attached, the arrangement being such that during forward rotation, said axle and crank arm rotate forwardly and said housing is stationary, while during reverse movement of said crank arm, said housing moves to activate said brake activator.

2. The assembly of claim 1, wherein the reverse movement of said crank arm may be selected so as to actuate said brake activator.

3. The assembly of claim 1, wherein said axle is preferably a standard bottom bracket axle of said bicycle.

4. The assembly of claim 1, wherein said connection has attached thereto a pedal shaft of a pedal.

5. The assembly of claim 1, wherein said crank is frictionally engaged to a bottom bracket axle of said bicycle.

6. The assembly of claim 1, wherein said unidirectional variable clutch may be formed in said housing by providing an annular sleeve secured to and located between said one end of said crank arm and said housing, said annular sleeve being spaced from said housing by a series of roller bearings, an inner face of said housing in contact with said roller bearings having arc-shaped cam surfaces on which said roller bearings can move to frictionally engage an outer surface of said annular sleeve during reverse movement of said crank arm, to thereby create said unidirectional variable clutch action.

7. The assembly of claim 6, wherein said housing is adapted so that the inner face of said housing, in contact with said roller bearings, is movable relative to said housing.

8. The assembly of claim 7, wherein said housing is adapted from a modified housing and a clutch outer releasably secured therein, said clutch outer incorporating said arc-shaped cam surfaces.

9. The assembly of claim 8, wherein said clutch outer incorporates one or more recesses adapted so that a locking member can removably engage one of said recesses, thereby securing said clutch outer in fixed relation to said housing.

10. The assembly of claim 9, wherein said locking member comprises a rotatable member adapted so as to engage at least one of said recesses over a first range of said rotatable member's rotation, and be disengaged from said recesses over a second range of said rotatable member's rotation.

11. The assembly of claim 10, wherein said rotatable member comprises a cylinder having a longitudinal portion removed therefrom, said cylinder portion having a geometry so that said cylinder engages said clutch outer when said cylinder is rotated over a first portion of its rotation.

12. The assembly of claim 10, wherein said rotatable member is substantially in the shape of a right cylinder or frustum of a cone suitably adapted so as to be capable of rotational engagement with said recesses.

13. The assembly of claim 9, wherein said locking member is operated by means of an arm or lever actuated by a cable connected to a switch.

14. The assembly of claim 9, wherein said locking member is biased so as to lock the clutch outer in fixed relation to said housing.

15. The assembly of claim 9, wherein said locking member is biased so as to allow free movement of said clutch outer with respect to said housing.

16. The assembly of claim 9, wherein said locking member, when biased so as to lock said clutch outer, is released or engaged by hand actuation of said brakes.

17. The assembly of claim 6, wherein said roller bearings are protected by fitting a spacer on said one end of said crank arm and holding it and said roller bearings, said annular sleeve and said housing in place with a circlip.

18. A cable bias clamp suitable for use in a bicycle brake system, adapted to provide differential braking to front and rear wheels of said bicycle, comprising:
   a member adapted to be attached, at a first and second location, to front and rear brake cables; and
   a tensioning means located asymmetrically with respect to the longitudinal axis of said front and rear brake cables so that when tension is applied to the tensioning means, differential tension is applied to the front and rear brake cables.

19. The cable bias clamp of claim 18, wherein the member incorporates a channel adapted to allow a continuous portion of said brake cable to be threaded therethrough;
   a first end of said continuous portion corresponding to said front brake cable and a second end of said continuous portion corresponding to said rear brake cable;
   a locking mechanism adapted to secure said continuous portion of said brake cable in said channel; and
   an attachment pin located in an aperture in said member, said pin being adapted for attachment to an actuation means wherein said pin is located asymmetrically in relation to the front and rear brake cables so that when a force is applied to said pin a differential tension is applied to the front and rear brake cables.

20. The cable bias clamp of claim 18, wherein said member incorporates an inverted apex offset towards one of said brake cable locations, wherein said pin is located proximate said inverted apex.

21. The cable bias clamp of claim 18, wherein said pin is located closer to the longitudinal axis of the rear brake cable than the longitudinal axis of the front brake cable.

* * * * *